March 1, 1927.
M. L. ADAMS
LUBRICATOR
Filed Sept. 27, 1924  2 Sheets-Sheet 1
1,619,779
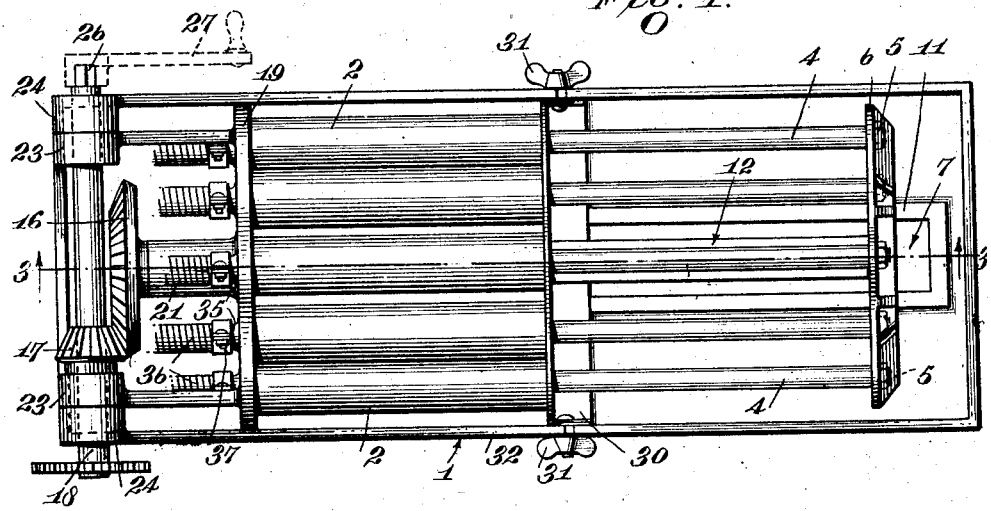
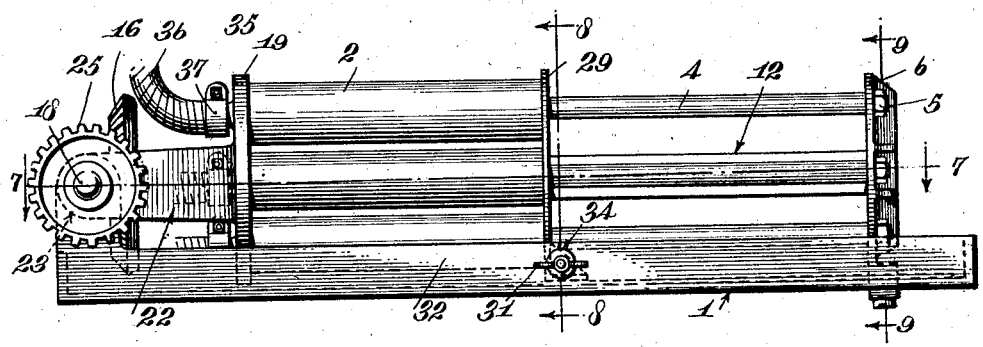
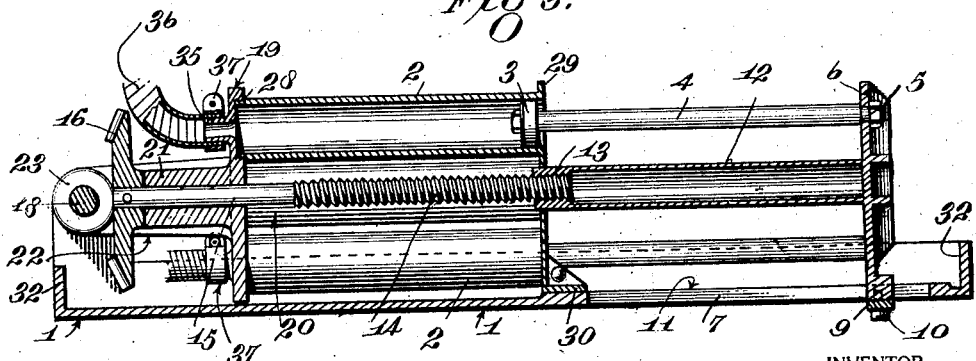
WITNESSES
M. Fowler
J. P. Schrott
INVENTOR
Morton L. Adams
BY
ATTORNEYS

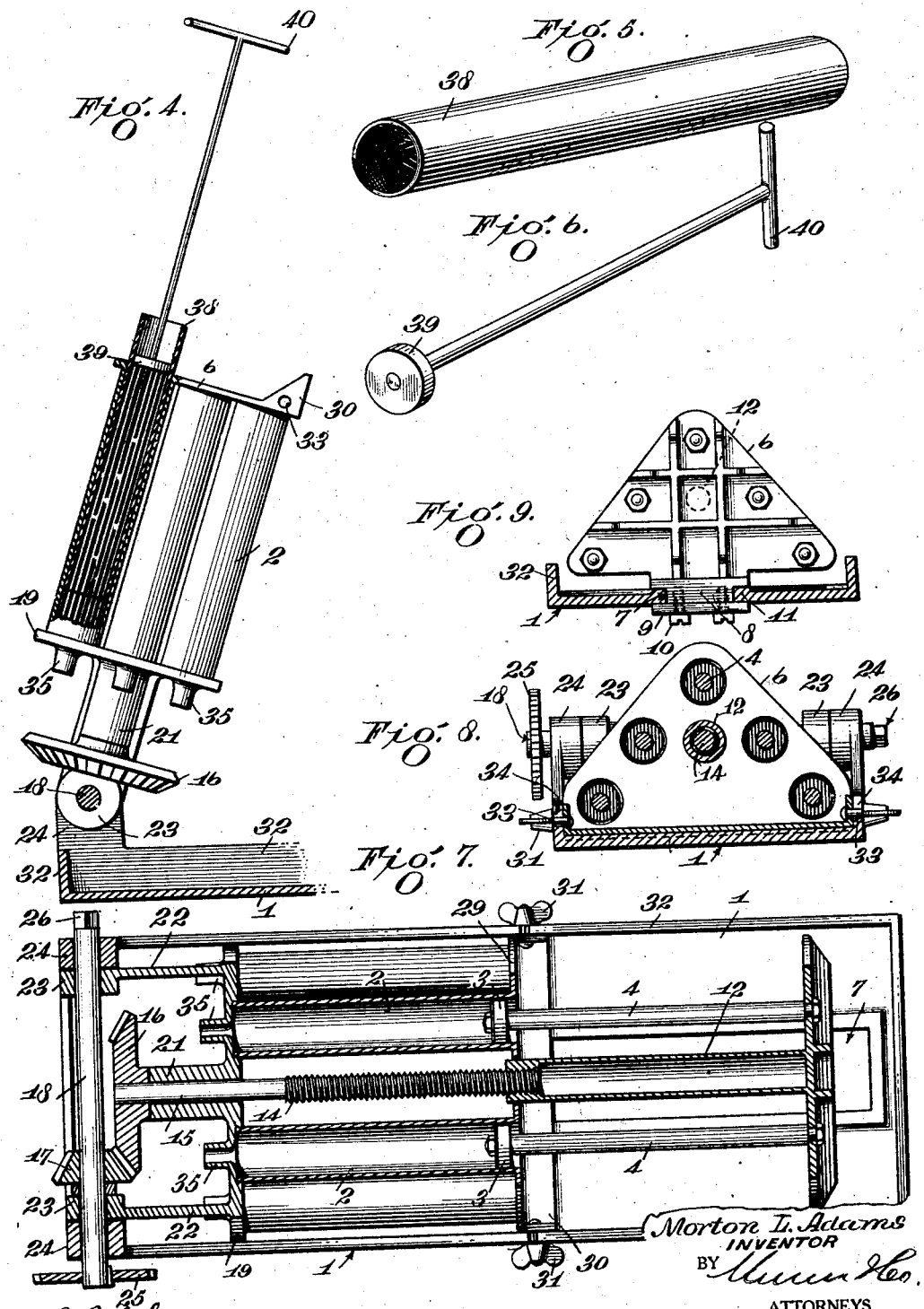
March 1, 1927. M. L. ADAMS 1,619,779
LUBRICATOR
Filed Sept. 27, 1924 2 Sheets-Sheet 2
Morton L. Adams
INVENTOR Patented Mar. 1, 1927.

1,619,779

UNITED STATES PATENT OFFICE.

MORTON LEE ADAMS, OF SEATTLE, WASHINGTON.

LUBRICATOR.

Application filed September 27, 1924. Serial No. 740,361.

My invention relates to improvements in lubricating devices, and it consists of the constructions, combinations and arrangements herein described and claimed.

An object of the invention is to provide what is sometimes known as a force-feed lubricator or grease gun for the purpose of forcing heavy oils, grease and the like to the bearing surfaces which are to be lubricated.

Another object of the invention is to provide a pressure lubricator which embodies a plurality of so-called grease guns, all of which are simultaneously operable to supply the desired number of bearing surfaces with a suitable lubricant at one time.

Another object of the invention is to provide a lubricator which is intended to be installed as a part of the engine or machine which it serves, and operated by a suitable arrangement of gearing.

Another object of the invention is to provide a pressure lubricator in which the block of grease cylinders are capable of being swung to a tilted position for filling, a novel manner of filling the cylinders also being employed.

Other objects and advantages will appear in the following specification, reference being had to the accompanying drawings, in which—

Figure 1 is a plan view of the improved lubricator.

Figure 2 is a side elevation.

Figure 3 is a central longitudinal section taken substantially on the line 3—3 of Figure 1.

Figure 4 is a detail view illustrating the cylinder block in the tilted and filling position, also illustrating the use of the novel means for filling the cylinder with grease.

Figure 5 is a detail perspective view of a sleeve which contains grease by which a cylinder is filled.

Figure 6 is a detail perspective view of a plunger by which the grease is forced out of the sleeve.

Figure 7 is a horizontal section of the lubricator taken substantially on the line 7—7 of Figure 2.

Figure 8 is a cross section on the line 8—8 of Figure 2,

Figure 9 is a cross section on the line 9—9 of Figure 2.

In carrying out the invention provision is made of a base 1 which is intended to be mounted in any suitable manner upon the framework of the machine, the bearings of which are to be lubricated. For this purpose the base 1 carries a plurality of cylinders 2, in each of which there is situated a piston 3 carried by a piston rod 4. All of the piston rods are suitably affixed at 5 to a cross head 6 which is guided upon the base during reciprocatory movement.

A slot 7 in a portion of the bottom of the base 1 receives the somewhat exaggerated T-head 8 of the cross head 6. A plate 9 is secured to the T-head at 10, the resulting arrangement providing a slide for the cross head which is movable upon the raised and faced portions 11 at the sides of the slot.

Fixedly carried by the cross head 6 is a tube 12, the open end of which is internally threaded at 13 to move upon the screw threads 14 of the driving shaft 15 when the latter is turned by means of a gear 16. This gear meshes with a pinion 17 on a counter or driven shaft 18. The threads 14 stop short of the common cylinder head 19 in order to provide a space 20 into which the internal threads 19 may ultimately move and thus stop the advance of the cross head 6 and pistons 3 even though the drive shaft 15 should continue to rotate. The drive shaft 15 is journaled in a bearing 21 carried by the cylinder head 19. This bearing is of sufficiently ample proportions to support the drive shaft 15 when the threads 14 are released from the tube 12. This occurs when the cylinder block is tilted into the filling position (Fig. 4). The plurality of cylinders and the common head 19 which carries them is herein known as the cylinder block. This common head includes a pair of arms 22 (Fig. 1) which terminate in bosses 23 through which the counter shaft 18 passes. The counter shaft itself is journaled in bearings 24 upon the base 1 and provides a pivotal mounting upon which the cylinder block may be swung to the tilted and filling position. Any suitable driving means for the lubricator may be adopted. The counter shaft 18 is shown as fitted with a gear 25 which in practice may be driven by other gears. The opposite end of the counter shaft is squared at 26 to receive a crank 27 (dotted lines) by means of which the pistons 3 may be rapidly backed out of the various cylinders preparatory to the filling operation.

Each of the various grease cylinders 2 is substantially fitted into the common head 19 in any suitable manner, as for example by means of threads 28 as shown in Fig. 3. The opposite and open ends of the cylinders are also substantially fitted into an abutment plate 29, so-called because of the fact that it carries or terminates in a flange or abutment 30. This abutment rests upon a suitable stop formed upon the bottom of the base 1 when the grease cylinders are in the horizontal and operative positions. The cylinders are held in this position by means of wing-nuts 31 which bind against the upstanding flanges 32 of the base. The wing-nuts are threaded upon studs 33 fixedly carried by the abutment flange 30. The upstanding flanges 32 are properly slotted at 34 to permit passage of the studs and to accomplish the foregoing binding function of the wing-nuts 31.

Formed upon the common cylinder head 19 at the outlet of each cylinder 2 is a nipple 35. A flexible hose or conduit 36 is suitably clamped at 37 to each of the respective nipples. The grease is forced out of the cylinders by the forward motion of the pistons 3, and upon entering the conductors 36 are carried to the various bearing surfaces which are intended to be lubricated.

Due consideration has been given to the problem of filling the cylinders 2 with grease. This is accomplished most satisfactorily by tilting the cylinder block into the position shown in Figure 4. It is for this purpose that the cylinder block is provided with a pivotal mounting upon the counter shaft 18. Grease is furnished in sleeves 38, one of which is shown in detail in Figure 5. This sleeve is small enough to permit slipping it in place inside of one of the cylinders 2. A plunger 39 is furnished also. This plunger has a handle 40. Upon inserting the plunger 39 in the sleeve 38, holding the plunger in position by means of the handle and pulling outward on the sleeve 38 the grease will be left in the cylinder 2, in other words the cylinder will be filled. The now empty sleeve 38 may be discarded.

The operation may be readily understood from the following additional description. The manner of filling the individual grease cylinders 2 was just described. It is necessary to fill each of the cylinders before the lubricator can be set in operation. To fill the cylinders most conveniently the entire cylinder block is tilted into the substantially upright position in Figure 4. Each of the cylinders is treated in turn by means of the plunger 39 and grease sleeve 38.

Having filled all of the grease cylinders the cylinder block is let down upon the base 1 so that it assumes the operative position in Figure 3. The abutment flange 30 rests upon the bottom flange of the base and thus sustains the cylinder block in position. In order to keep the cylinder block in this position use is made of a pair of wing-nuts 31 which clamp against the upstanding flanges or sides of the base.

The drive or screw shaft 15 may be regarded as quite loosely mounted upon the base. The main support for the shaft occurs in the bearing 21. The remainder of the support is furnished by the engagement of the threads 14 with the short threaded portion 13 inside of the tube 12. Upon rotating the shaft 15 by means of the pinion 17 and gear 16, the tube 12, cross head 6 and all of the pistons 3 will be moved forward quite slowly. In practice, the threads 13 and 14 should be arranged at such a pitch that the forward movement of the pistons will be slow. If this slow movement cannot be accomplished by the arrangement of the threads, then the driving gearing will have to be such so that this purpose is accomplished.

Grease is forced out of each of the cylinders 2 simultaneously upon the forward movement of the cross head 6. The cross head is guided upon the base by means of the T-head 8 and the under plate 9 (Fig. 9). The time will eventually come when the internal threads 13 will reach the blank space 20 on the drive shaft 15. This arrangement is a precautionary measure, because were it not for the blank space 20, continued driving of the shaft 15 would tend to continue the forward movement of the plunger 6 with the result that the mechanism would be damaged. The movement of the cross head 6 will stop when the aforesaid space is reached even though the drive shaft 15 should continue to rotate.

The crank 27 is fitted upon the squared end 36 of the counter shaft 18 when it is desired to move the cross head 6 backward and back all of the pistons 3 out of the various cylinders. This retrograde movement is continued until the cylinder block and the screw shaft 15 are entirely free of the pistons 3 and tube 12 respectively. It is then that the cylinder block may be swung up to the tilted position (Fig. 4) for refilling.

In conclusion it is to be observed that the cross head 6 is itself of relatively thin material, (Figs. 1, 2 and 3) but that it is strengthened by a system of bracing as shown in Figure 9. It is also to be observed that the various piston rods 4 are disposed according to a substantially triangular arrangement. This, in practice, is not absolutely essential, because any disposition of a plurality of cylinders and piston rods may be made according as may be desired. The various piston rods 4 are grouped about the tube 12 which has a relatively central location.

While the construction and arrangement of the improved lubricator is that of a generally preferred form, obviously modifications and changes may be made without departing from the spirit of the invention or the scope of the claims.

I claim:—

1. A pressure lubricator comprising a base, a lubricant cylinder mounted upon the base, a cross head slidable upon the base carrying a piston operable in the cylinder, driving means mounted upon the base having operative connection with the cross head for advancing it in one direction for forcing out lubricant, means by which reverse movement of the cross head is accomplished to back the piston out of the cylinder preparatory to refilling the cylinder with lubricant, and means providing a pivotal mounting permitting tilting the cylinders at an angle to the base to permit filling.

2. A pressure lubricator comprising a base, a lubricant cylinder, means upon which the cylinder is mounted for movements either to a filling position or into an operative position in respect to the base, means carried by the cylinder for limiting the latter movement, means for fixing the cylinder in the latter position, a cross head slidably mounted upon the base having a piston operable in the cylinder to force out lubricant, and driving means for advancing the cross head toward the cylinder.

3. A pressure lubricator comprising a lubricant cylinder a cylinder head in which the cylinder is fixed at one end to close said end, a plate in which the opposite but open end of the cylinder is fixed, arms carried by the cylinder head, a base supporting a counter shaft, a drive shaft operated by the counter shaft, a cross head slidable upon the base and having a piston operating in the cylinder, said arms being pivotally mounted upon the counter shaft to permit tilting the cylinder and its carried parts to a filling position upon removal of the piston, and abutment means comprising a flange carried by said plate arranged to contact the base when the cylinder is in the operative position.

4. A pressure lubricator comprising a lubricant cylinder a cylinder head in which the cylinder is fixed at one end to close said end, a plate in which the opposite but open end of the cylinder is fixed, arms carried by the cylinder head, a base supporting a driving shaft, a drive shaft operated by the driving shaft, a cross head slidable upon the base and having a piston operating in the cylinder, said arms being pivotally mounted upon the driving shaft to permit tilting the cylinder and its carried parts to a filling position upon removal of the piston, abutment means comprising a flange carried by said plate arranged to contact the base when the cylinder is in the operative position, and means including a stud and thumb screw carried by the abutment plate for so engaging the base as to lock said base and cylinders in the operative position.

5. A pressure lubricator comprising a base, a plurality of lubricant cylinders each having a lubricant conductor, a common cylinder head upon which all of the cylinders are mounted and to which said conductors have connection in communication with the cylinders, a plate to which the opposite but open ends of the cylinders have common connection, a counter shaft journaled upon the base carrying a pinion, a drive shaft journaled upon the cylinder head having a gear meshing therewith, a cross head carrying rods and pistons operable in said cylinders, and a slide-way on the base upon which the cross head is guided.

6. A lubricator comprising a countershaft having a pinion, a lubricant cylinder, a removable piston, means for operating the piston in the cylinder including a driving shaft having a gear meshing with the pinion, and means pivotally mounting the cylinder upon the countershaft permitting turning the cylinder to a filling position after removal of the piston without disengaging the gear and pinion.

7. A lubricator comprising a base having a stop, a countershaft, a lubricant cylinder, a piston reciprocable in the cylinder by the countershaft, removal of the piston being permissible, and means pivotally mounting the cylinder upon the countershaft permitting swinging it from a normally contacting position upon the stop upon removal of the piston to an upright position in reference to the base for filling.

8. A pressure lubricator comprising a lubricant cylinder, a movable cross head having a piston fitting in the cylinder to force out the lubricant, driving means for advancing the cross head in one direction, said means including a driven counter-shaft, and means comprising arms by which the cylinder is held in spaced relationship to the countershaft and furnishing a pivotal mounting for the cylinder which permits swinging the cylinder about the countershaft as an axis to a filling position.

9. A lubricator comprising a base, a piston operable in a prescribed rectilinear path upon the base, a cylinder, and means mounting the cylinder upon said base for swinging the cylinder away from the piston permitting filling the cylinder with lubricant when disengaged from the piston.

MORTON LEE ADAMS.